United States Patent [19]

Maejima et al.

[11] 4,317,171

[45] Feb. 23, 1982

[54] LSI MICROPROCESSOR HAVING AN ERROR PROCESSING CIRCUIT

[75] Inventors: Hideo Maejima; Kunihiko Ohnuma, both of Hitachi, Japan

[73] Assignee: Hitachi, Ltd., Tokyo, Japan

[21] Appl. No.: 37,459

[22] Filed: May 9, 1979

[30] Foreign Application Priority Data

May 12, 1978 [JP] Japan ................. 53-55601

[51] Int. Cl.³ .................. G06F 3/00; G06F 11/00
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,573,851 | 4/1971 | Watson et al. | 364/200 |
| 3,962,682 | 6/1976 | Bennett | 364/200 |
| 4,003,033 | 1/1977 | O'Keefe et al. | 364/200 |
| 4,050,058 | 9/1977 | Garlic | 364/200 |
| 4,084,236 | 4/1978 | Chelberg et al. | 364/200 |
| 4,087,856 | 5/1978 | Attanasio | 364/200 |

*Primary Examiner*—Joseph M. Thesz
*Assistant Examiner*—David Y. Eng
*Attorney, Agent, or Firm*—Craig and Antonelli

[57] ABSTRACT

An LSI microprocessor comprising an instruction fetch portion and an instruction execute portion which fetches an instruction and executes an instruction independently of each other under a microprogram control, a pipeline control being made while synchronizing the portions, the instruction fetch portion containing therein an error processing circuit, which receives an external memory error signal concerning a main memory and an internal protect error signal and which delivers a reset signal for clearing a microprogram counter and starting an error processing microprogram.

6 Claims, 17 Drawing Figures

FIG. 3
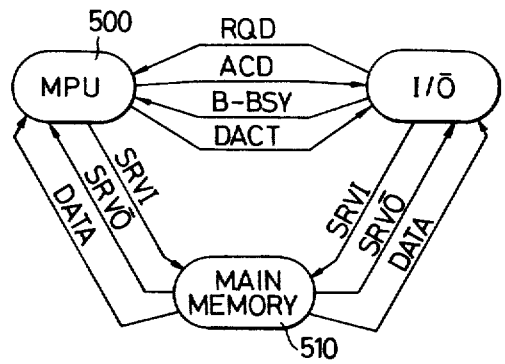
FIG. 4
| I/O 0 | I/O 1 | CONTENTS |
|---|---|---|
| 0 | 0 | NO OPERATION |
| 0 | 1 | SRVI |
| 1 | 0 | DACT |
| 1 | 1 | ACD |
FIG. 5
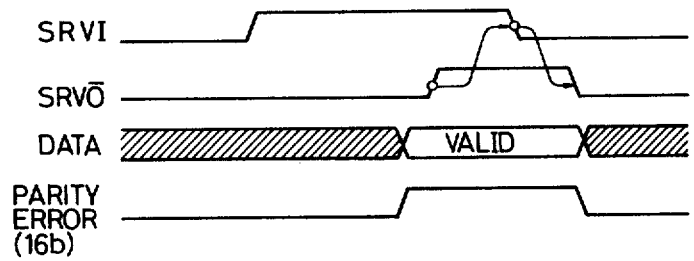
FIG. 6
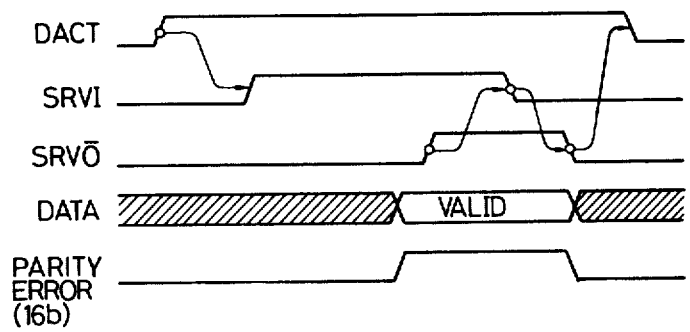

LSI MICROPROCESSOR HAVING AN ERROR PROCESSING CIRCUIT

BACKGROUND OF THE INVENTION

In recent years, as regards microprocessors constructed of semiconductor devices, especially of N-MOS (N-channel metal-oxide-semiconductor) transistors, it has become possible owing to the rapid progress of the semiconductor processing technology to produce such microprocessors which have high performance in spite of being at high densities of integration.

Owing to the high integration, the reliability of the processor is being enhanced with a decrease in the number of components. However, when a main memory is also taken into consideration, various factors for causing errors still exist.

Whether the error factor is attributed to hardware or to software, it is necessary to find out the factor as fast as possible and to return the processor to normalcy.

Especially in a processor used for control purposes, an error brings about a malfunction of the associated system which leads to system-down time. It is therefore an important matter to endow the processor with an RAS (reliability, availability, serviceability) function. In such uses, accordingly, the RAS function cannot be ignored even in the case of a microprocessor.

Heretofore, microprocessors have been employed for small-scale systems and often used in places where their malfunctions do not lead to any serious accident. Therefore, the error detecting function and the error processing function have been often omitted.

However, as microprocessors have had the performances and functions enhanced, some have reached the point of not being inferior to minicomputers in terms of performances and functions, and a RAS function to the same extent as in the minicomputer has been urgently needed for such microprocessors.

On account of various limitations of microprocessors, such as limitations in the architecture, limitations in the package (number of pins), and limitations in the density of integration, it has heretofore been difficult to assemble the error detecting function and the error processing function into an LSI (large scale integration) of a microprocessor and therefore such arrangements have generally not be constructed.

Instead, it has hitherto been common to cope with error processing by an LSI external circuit. The external circuit has accordingly increased the overall circuit size to make the scale of the whole processor large, which has been a most serious disadvantage.

This invention relates to an LSI microprocessor comprising an instruction fetch portion and an instruction execute portion which fetch and execute instructions are independent of each other under a microprogram control and which are subjected to a pipeline control while being synchronized.

Here, the "LSI microprocessor" has the instruction fetch portion and the instruction execute portion made up of one or two LSI chips. In this specification, for the sake of convenience of the description, the expression shall indicate a processor wherein each of the instruction fetch portion and the instruction execute portion is constructed of one LSI chip.

SUMMARY OF THE INVENTION

The principal object of this invention is to provide an LSI microprocessor which contains therein an error processing circuit that reduces or scales down the input-/output signal lines and external circuit of the microprocessor and that makes it possible to easily perform a microprogram control attendant upon the development of an error.

Another object of this invention is to provide an LSI microprocessor in which a protect error developing during a pipeline control has no influence on an instruction processing under execution.

Another object of this invention is to provide an LSI microprocessor in which hardware information is frozen upon the development of an error.

Still another object of this invention is to provide an LSI microprocessor in which a reset output signal to be delivered from the microprocessor and a system reset signal to be bestowed on the microprocessor are coupled and applied by the use of a single signal line and can be separated in the interior.

A feature of this invention consists in that an error processing circuit is contained, which receives a protect error having occurred therein and an external memory error signal concerning a main memory and which delivers a reset signal to clear a microprogram counter of a microprogram memory to start an error processing microprogram and simultaneously freezes an operating status in the interior of an LSI.

Another feature of this invention consists in comprising a memory error input gate which receives an externally detected memory error signal when a certain specified condition holds, a memory error flip-flop which stores therein the memory error signal from the memory error input gate, a reset generating gate which delivers the memory error signal stored in the memory error flip-flop, in a cycle in which an instruction fetch portion is not executing fetch of the next instruction, and a reset output driver which delivers the output of the reset generating gate to clear a microprogram counter of a microprogram memory to start an error processing microprogram.

Another feature of this invention consists in that an output signal of a reset output driver to be delivered to clear a microprogram counter of a microprogram memory to start an error processing microprogram and a system reset signal to enter a microprocessor from the exterior are coupled by a single signal line and then received into an error processing circuit so as to initialize the error processing circuit.

Another feature of this invention consists in comprising two flip-flops which store therein a protect error developing in the interior, and one of which is reset by a reset output signal or a system reset signal and the other of which is reset by only the system reset signal.

Other objects and features of this invention will become apparent from the statement of the detailed description of the preferred embodiments.

BRIEF DESCRIPTION OF THE DRAWINGS

FIG. 3 is a diagram for explaining input/output signals, FIG. 4 is a diagram which indicates codes of input-/output control outputs of the microprocessor in FIG. 2, FIGS. 5, 6 and 7 are time charts each of which illustrates the occurrence of a parity error.

DETAILED DESCRIPTION OF THE PREFERRED EMBODIMENTS

Figure 1:
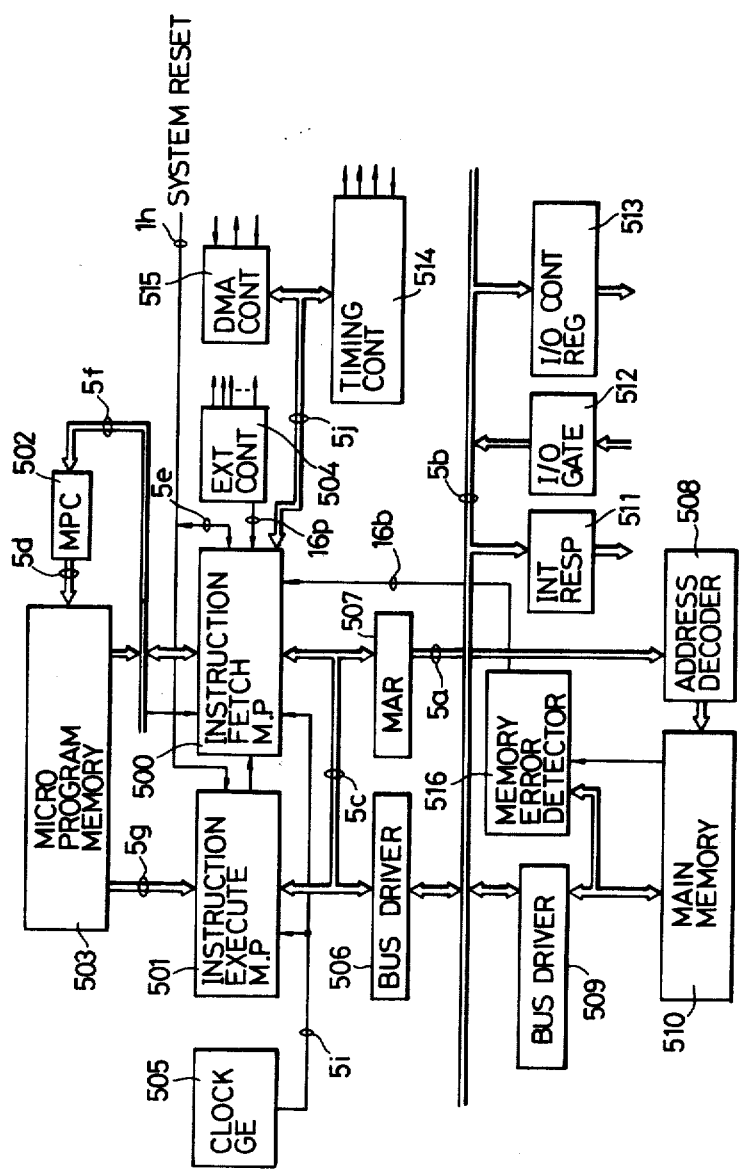
FIG. 1 is the general block diagram of a pipeline-controllable data processor including this invention.

FIG. 1 is the whole block diagram of a pipeline-controllable data processor including this invention. The data processor is constructed of an instruction fetch microprocessor 500, an instruction execute microprocessor 501, a microprogram counter 502, a microprogram memory 503, an external control circuit 504 which controls circuits other than the microprocessors 500 and 501, a clock generator 505 which puts the whole data processor into synchronism, a bus driver 506 which connects an LSI bus 5c of the microprocessors 500 and 501 and a memory bus 5b, a memory address register 507, an address decoder 508, a bus driver 509 which connects a main memory 510 and the memory bus 5b, the main memory 510 in which macro instructions and operands are stored, an interrupt response register 511 for a response to an accepted interrupt, a gate 512 for loading a select request signal from an input/output (hereinbelow, abbreviated to "I/O"), an I/O control register 513 in which information for controlling the I/O are stored, a timing controller 514 which handles various asynchronous timings, a direct memory access (hereinbelow, abbreviated to "DMA") controller 515, and a memory error detector circuit 516 which detects a parity error and an address over.

The instruction fetch microprocessor 500 receives through a bus 5f a micro instruction read out from the microprogram memory 503, whereby the fetch start is actuated. Then, the internal fetch control operates, so that the content of a program counter included in the microprocessor 500 passes through the LSI bus 5c to be set in the memory address register 507 and to access the main memory 510 by means of the address decoder 508. Instruction word read out from the main memory 510 passes through the bus driver 509, the memory bus 5b, the bus driver 506 and the LSI bus 5c, it is received into the microprocessor 500, and it is set as an instruction word in an instruction register included therein.

Upon decoding the instruction word, a microprogram address corresponding to the instruction word at 1-to-1 is set in the microprogram counter 502 through the bus 5f, and the microprogram memory 503 is accessed through a micro address bus 5d. Thus, the first micro instruction of a microprogram routine corresponding to the instruction word is read out from the microprogram memory 503. It is transmitted to the instruction execute microprocessor 501 by a bus 5g and to the instruction fetch microprocessor 500 by the bus 5f. The respective microprocessors 500 and 501 successively process the micro instruction to execute an instruction.

During the processing, the external circuits other than the microprocessors 500 and 501 are controlled by the external control circuit 504, the control of timings associated with the access to the main memory 510 is made by the timing controller 514, and the clock generator 505 is controlled by the timing controller 514 to bring the asynchronous states of the main memory 510 etc. into synchronism.

If there is a DMA request during the execution of the instruction, the service is made by the microprocessor 500 and the DMA controller 515.

On the other hand, an interrupt request is accepted between instructions, and the priority decision among a plurality of levels and the mask are performed. The result is made known to the I/O through the interrupt response register 511. Regarding which I/O is generating the interrupt, the select request signal of the I/O is made known to the microprocessors 500 and 501 through the gate 512, the memory bus 5b, the bus driver 506 and the LSI bus 5c.

In the I/O control, an operation command and equipment assignment thereof are set in the I/O control register 513 to stipulate the control content.

Any error (parity error or address over) of the main memory 510 developing in the above various processings is detected by the memory error detector 516, and is reported to the instruction fetch microprocessor 500 through a signal line 16b. As a result, the microprogram counter 502 is cleared by a reset signal 5e and appoints address "0", from which the error processing is initiated.

Likewise, when a system reset signal 1h has been applied, the microprogram counter 502 is cleared, and the error processing is initiated.

Figure 2:
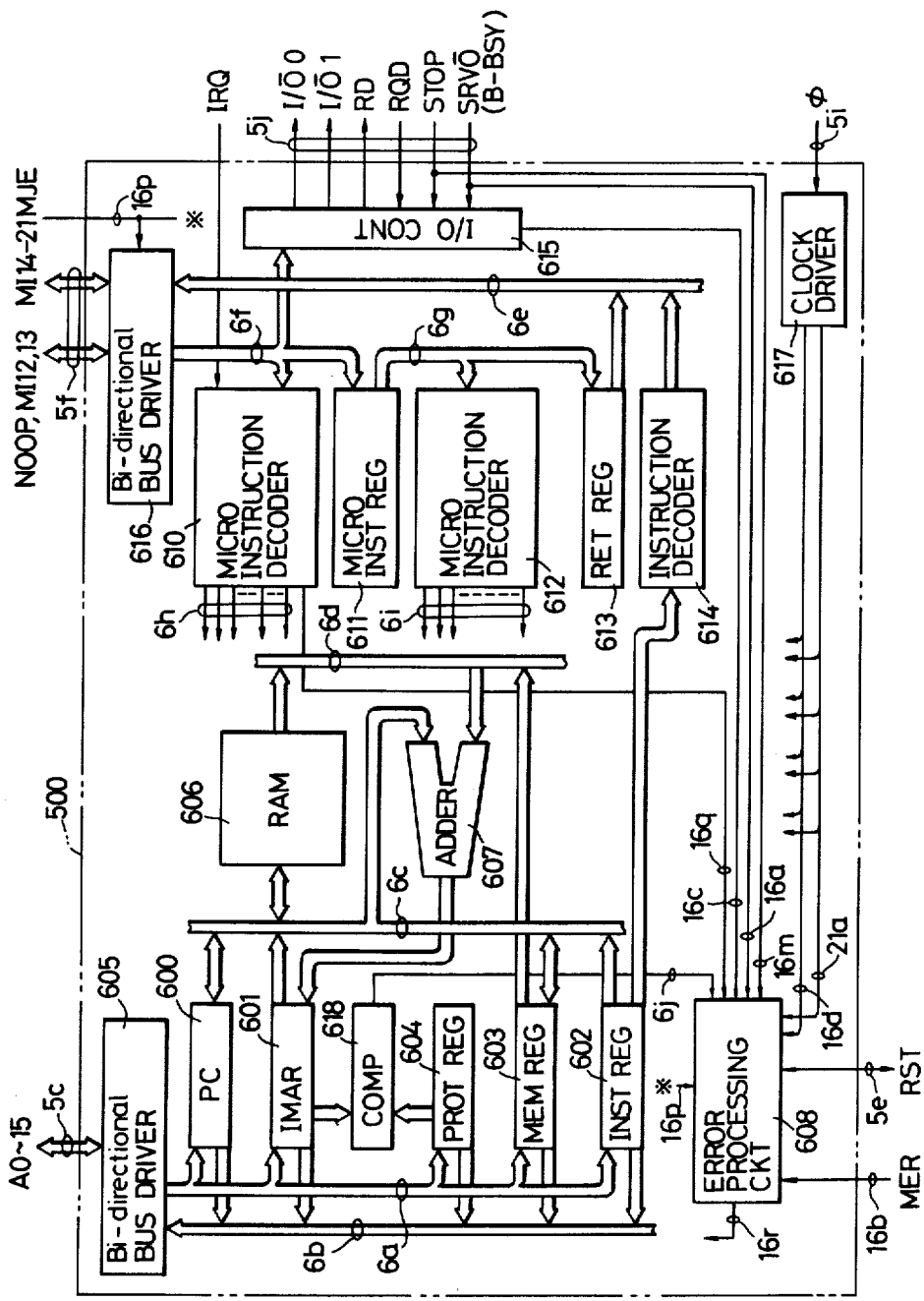
FIG. 2 is a block diagram of an instruction fetch microprocessor including this invention.

Now, a concrete example of the instruction fetch microprocessor 500 will be described with reference to FIG. 2.

The instruction fetch microprocessor 500 is made up of a program counter 600, an internal memory address register (hereinbelow, abbreviated to "IMAR") 601, an instruction register 602, a memory register 603, a protect register 604, an input bus 6a and an output bus 6b inside the LSI, a bidirectional bus driver 605, a 2-port RAM (random access memory) 606 in which registers for address qualifications for computing operand addresses are collected, an adder 607 for computing addresses, an error processing circuit 608 which processes errors detected inside and outside the microprocessor 500, a decoder 610 which decodes micro instructions applied through a bidirectional bus driver 616 and delivers various control signals 6h, a micro instruction register 611 which temporarily stores the micro instructions, a decoder 612 which decodes contents of the register 611 and delivers various control signals 6i, a return register 613 for subroutines of microprogram levels, an instruction decoder 614 which decodes contents of the instruction register 602, an I/O controller 615 which controls the main memory 510 and the I/O, the bidirectional bus driver 616 for receiving the micro instructions and delivering branch addresses of microprograms, a clock driver 617 for synchronously controlling the above circuits, and a comparator 618 for detecting a protect error.

Since the microprocessor 500 chiefly performs the instruction fetch, the various errors (parity error, address over, protect error) develop when this microprocessor 500 operates to access the main memory 510.

Now, the two control modes of the instruction fetch control and the instruction execute control (usually, micro instruction control) will be described.

(1) Instruction Fetch

In a case where a micro instruction read out from the microprogram memory 503 indicates the fetch initiation, the micro instruction received through the bidirectional bus driver 616 is applied through a bus 6f to the micro instruction decoder 610, in which the various control signals 6h putting signals on buses 6b–6e and an "under fetch" signal 16q are obtained.

Thus, the content of the program counter 600 is transmitted to the output bus 6b and is transmitted as address information to the external bus 5c through the bidirection bus driver 605.

On the other hand, the micro instruction is put into the I/0 controller 615 and applies a start (SRVI) to the main memory 510. Until an instruction word is read out (SRVO is replied), the bidirectional bus driver 605 is held in an input direction, and it is awaited that the instruction word will be set in the instruction register 602 and the memory register 603 through the input bus 6a.

In the I/0 control, interface signals among the microprocessor (MPU) 500, the I/0 and the main memory 510 exist as shown in FIG. 3. Among these signals in the MPU 500, the main memory and the outputs "0" and "1" of the I/0 have rules as indicated in FIG. 4.

In FIGS. 3 and 4, SRVI designates a main memory start signal, SRVO a main memory response signal, RQD a DMA request signal, B-BSY a bus busy signal, and DACT an I/0 start signal.

When the instruction word has been set in the instruction register 602 and the memory register 603, the content of the instruction register 602 is decoded by the instruction decoder 614. In a case where the instruction read out is a one-word instruction, the content of the memory register 603 concerning the address information is transmitted to the bus 6d. In addition, the corresponding register of the 2-port RAM 606 is read out by a base register assignment portion (not shown) of the instruction register 602, and the content is transmitted to the bus 6c. An operand address is computed by the adder 607, and is set in the internal memory address register 601.

On the other hand, the instruction decoder 614 transmits to the bus 6e a microprogram address pattern corresponding to the instruction, which is set in the microprogram counter 502 through the bidirectional bus driver 616.

Thus, microprograms for instruction execution are sequentially read out from the microprogram memory 503, and they are executed by the microprocessors 500 and 501.

(2) Instruction Execute

In a case where the instruction decoded by the instruction decoder 614 is, for example, to write data into the main memory 510, an address to be written into the main memory 510 is the operand address operated in the instruction fetch, and this is stored in the internal memory address register 601.

Accordingly, the content of the register 601 is transmitted to the output bus 6b, and this address information is transmitted to the main memory 510 through the bidirectional bus driver 605.

Simultaneously therewith, the start (SRVI) is applied to the main memory 510 by the I/0 controller 615. In addition, the write data is transmitted from the microprocessor 500 to the main memory 510 through the bus 6b, the bidirectional bus driver 605 and the bus 5c. After waiting for the data write completion (SRVO) from the main memory 510, the execution of the next micro instruction is shifted to.

Accordingly, when the data is written into the main memory 510, the address information thereof agrees with the content of the internal memory address register 601. On the basis of this fact, a protect error can be detected only inside the microprocessor 500 with the address comparator 618 by setting a memory protection area in the protect register 604 in advance. The detection result is made known to the error processing circuit 608 through a signal line 6j. A memory error signal detected outside the microprocessor 500 is made known to the error processing circuit 608 through a signal line 16b, and is transmitted to the exterior as the reset signal 5e.

Thus, the microprogram counter 502 is cleared to initiate the error processing.

While the detailed description has been omitted as to hardware which is not directly relevant to the error detecting and the error processing, the above operations are synchronous with clock signals 16d and 21a which are supplied to various parts by the clock driver 617.

Now, the errors attendant upon the input/output operations will be described with reference to time charts.

Parity Error (a) Data Transfer from Main Memory to MPU (Main Memory→MPU):

As seen from a time chart in FIG. 5, the parity error (16b) occurs only at the readout of operands from the main memory 510, and it is transmitted from the error detector circuit 516 to the MPU 500 in synchronism with the response signal SRVO from the main memory 510.

The operands at the occurrence of the error is stored in the MPU 500 or the MPU 501, and the address information at that time agrees with the content of the internal memory address register 601 of the MPU 500. Therefore, this information can be stored into specified areas of the main memory 510 with an error processing microprogram.

(b) Data Transfer from MPU to I/0 (MPU→I/0):

As seen from a time chart in FIG. 6, the MPU transmits the I/0 start signal DACT to the I/0 so as to effect the I/0 start. Thereafter, the I/0 carries out an operation equivalent to that of the MPU in Item (a). However, insofar as the MPU is concerned, a parity error developing during this operation is processed by the MPU. The way of the processing is the same as in Item (a).

Figure 7:
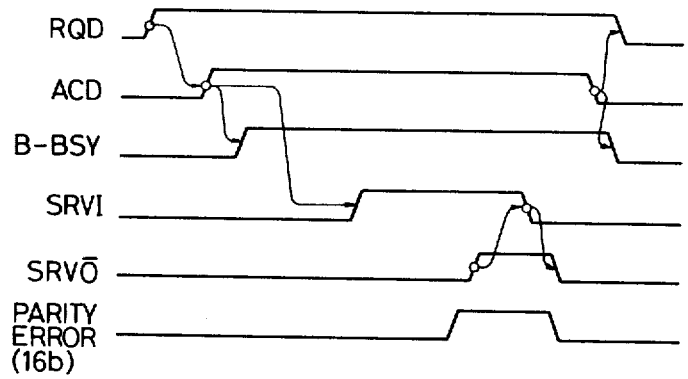

(c) DMA Transfer:

As seen from a time chart in FIG. 7, as to the DMA request signal RQD from the I/0, the MPU decides only whether or not the request is allowed. At the allowance, the MPU sends a DMA allowance signal (ACD) back to the I/0. Thereafter, information is exchanged only between the I/0 and the main memory, and the MPU is not related. Accordingly, a parity error developing in the present operation is merely communicated to the I/0.

Address Over

Figure 8:
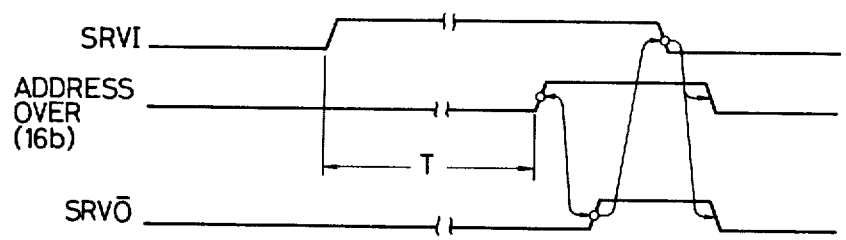
FIG. 8 is a time chart which illustrates the occurrence of an address over.

As seen from a time chart in FIG. 8, in the absence of the signal SRVO within a fixed time (T) after the signal SRVI has been applied to the main memory 510, the memory error detector circuit 516 judges the situation as an access to an unpackaged main memory area, namely, as the so-called address over.

In this case, at the time when the memory error detector circuit 516 has decided the address over, the address over signal (16b) is transmitted. Subsequently, the signal SRVO is transmitted.

Similar to the case of the parity error, the MPU has no concern in the occurrence of the address over during the DMA.

Protect Error

On the basis of the fact that whenever the MPU 500 controls the access to the main memory 510 the address information agrees with the content of the internal memory address register 601, the MPU 500 can detect a protect error in the interior thereof. Upon the detection of the error, the start (SRVI) to the main memory 510 is suppressed and a write protection is made, whereupon error processing is executed.

Figure 9:
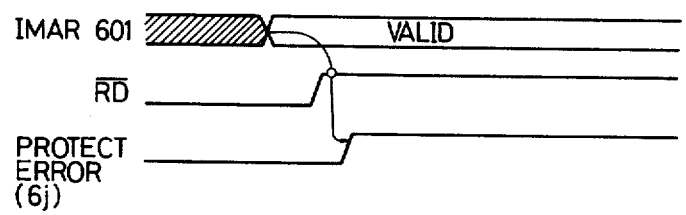
FIG. 9 is a time chart which illustrates the occurrence of a protect error.

FIG. 9 shows a time chart of the development of the protect error.

Figure 10:
FIG. 10 is a diagram which indicates error processing procedures in the case where an error has occurred during a non-pipeline control.
Figure 11:
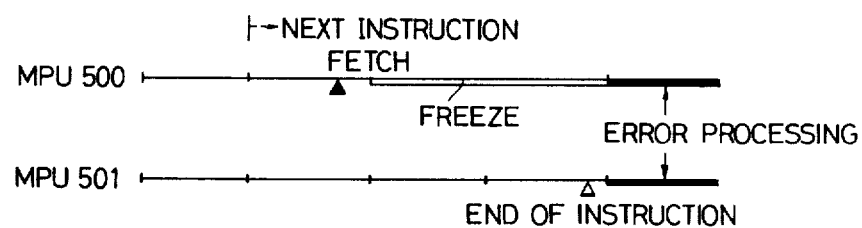
FIG. 11 is a diagram which indicates error processing procedures in the case where an error has occurred during a pipeline control.

In the above, the timings of occurrence of the memory error and the protect error have been explained. Referring now to FIGS. 10 and 11, there will be described how the relations between micro cycles undergoing the errors and microprograms should be set as the data processor of the pipeline control. In the data processor of the pipeline control, error processing procedures must be separated depending upon whether or not the fetch of the next instruction is started at the time of the development of an error.

In a case where, as illustrated in FIG. 10, the MPU 500 is not executing the fetch of the next instruction, both the MPUs 500 and 501 are executing an identical instruction. In this case, the processing may be immediately stopped upon occurrence of the error, and the error processing may be conducted. In contrast, in a case as illustrated in FIG. 11 where the MPU 500 is fetching the next instruction at the time of the occurrence of the error, the MPUs 500 and 501 are executing different instructions in parallel (pipeline control). Therefore, the error processing cannot be conducted until the MPU 501 ends the instruction execution.

It should be noted that when the processing is immediately stopped upon the occurrence of the error, as in FIG. 10, the irrationality that the next instruction gives a disturbance to the instruction under execution on account of the parallel processing nature of the pipeline control takes place.

On the other hand, the MPU 500 stops the fetch operation upon the development of the error, freezes the status at the development of the error, and shifts the control to the error processing subsequently to the completion of the instruction execution of the MPU 501.

Figure 12:
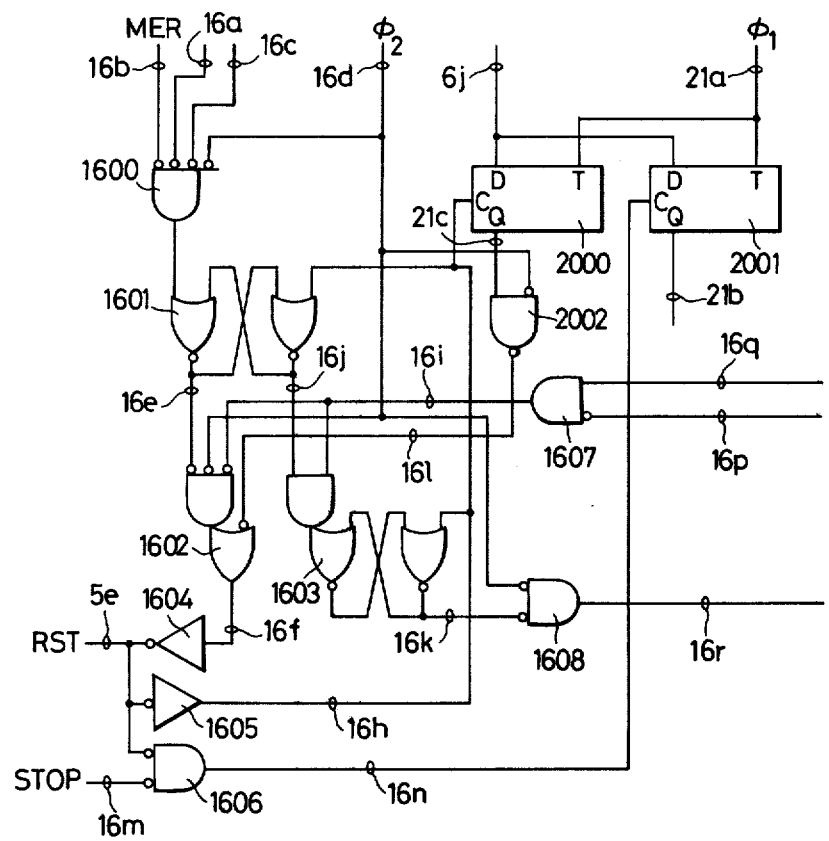
FIG. 12 shows a preferred embodiment of an error processing circuit which constitutes the essential feature of this invention.

Now, the error processing circuit 608 which forms the core of this invention will be described in detail with reference to FIG. 12.

The error processing circuit 608 is located within the MPU 500. It is composed of an input gate 1600 for the memory error 16b (parity error and address over) detected outside the MPU 500, a memory error flip-flop 1601 which temporarily stores the memory error, a reset generating gate 1602 which logically decides an information 16e stored in the flip-flop 1601, a freeze flip-flop 1603 which indicates the inhibit of an operation inside the MPU 500, a reset output driver 1604 which delivers the reset signal 5e to the exterior for clearing the microprogram counter 502 of the microprogram memory 503 to start an error processing microprogram, a reset input driver 1605 which receives the reset signal 5e and a system reset signal RST from the exterior, a system reset allowance gate 1606 which separates the reset 5e due to an error and the system reset RST, a gate 1607 which decides whether or not the pipeline is proceeding, a gate 1608 which supplies clocks 16r for setting registers, first and second flip-flops 2000 and 2001 which store the development of a protect error, and a gate 2002 for obtaining a protect error signal synchronous with a clock $\phi_2$ (16d).

First, there will be described the error processing operation in the case where an error has developed outside the instruction fetch MPU 500 in the state in which it has not started the fetch operation of the next instruction and where it has been detected.

The detected parity error or address over is applied to the memory error input gate 1600 through a signal line 16b.

At this time, the response signal SRVO from the main memory 510 is decided with a signal line 16a being one line of a bus 5j, the fact that the DMA is not proceeding is decided with a signal line 16c from the I/0 controller 615, and a clock cycle in which the memory error is to be applied is decided with the signal line 16d from the clock driver 617. The propriety of the applied memory error is confirmed by the memory error input gate 1600. If the memory error is proper, it is stored in the memory error flip-flop 1601.

The above logical decision serves also to prevent the flip-flop 1601 from being set by noise etc.

In the state in which the MPU 500 is not executing the fetch operation, a signal 16q from the instruction decoder 610, which indicates whether or not the fetch is proceeding, is "0", so that a signal line 16i being an output of the gate 1607 is "0". An output 16e of the flip-flop 1601 is also "0". Therefore, an output 16f of the reset generating gate 1602 becomes "1". Accordingly, the reset output driver 1604 delivers the reset output 5e ("0") to the exterior.

This reset output 5e clears the microprogram counter 502, and starts an error processing microprogram beginning from address 0 (zero).

On the other hand, the reset output 5e becomes a reset signal 16h through the reset input driver 1605, which signal resets the memory error flip-flop 1601 and initializes the error processing circuit 608.

Figure 13:
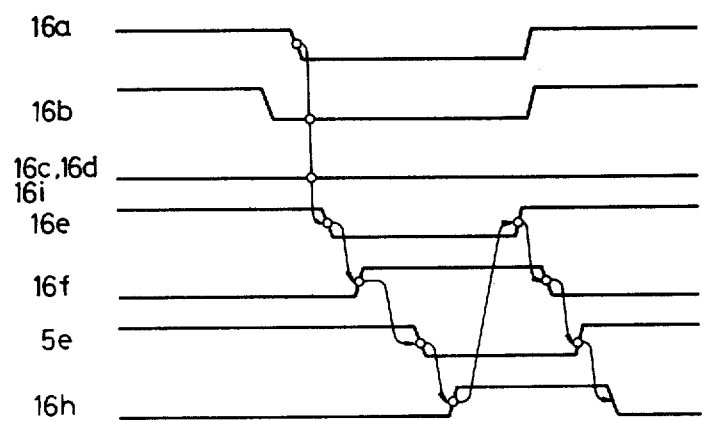
FIGS. 13, 14, 15 and 16 are time charts for explaining the operations of the error processing circuit at the time when errors have occurred.

A time chart in this operation is shown in FIG. 13.

In the next place, the error processing operation in the case where an error has developed outside the instruction fetch MPU 500 in the state in which it has started the fetch operation for the next instruction and where it has been detected will be described with reference to a time chart of FIG. 14.

The process until the memory error having developed outside the MPU 500 and having been detected is set in the memory error flip-flop 1601 is quite the same as in the foregoing. However, in the state in which the fetch is proceeding and the instruction execution is not completed yet, the "under-fetch" signal 16q from the micro instruction decoder 610 is "1", and a multi-jump enable signal 16p from the external control circuit 504 is "0", so that the signal line 16i is at "1" and that the output 16f of the reset generating gate 1602 is at "0". Instead of no external reset being conducted, the freeze flip-flop 1603 is set because the signal 16j is "1". In consequence, a signal line 16k becomes "1" to inhibit the gate 1608, so that the clock $\phi_2$ (16d) ceases passing through the signal line 16r.

Thus, the internal operation of the MPU 500 (chiefly, the data set into the register) is inhibited, and the status at the occurrence of the error is frozen.

Figure 14:
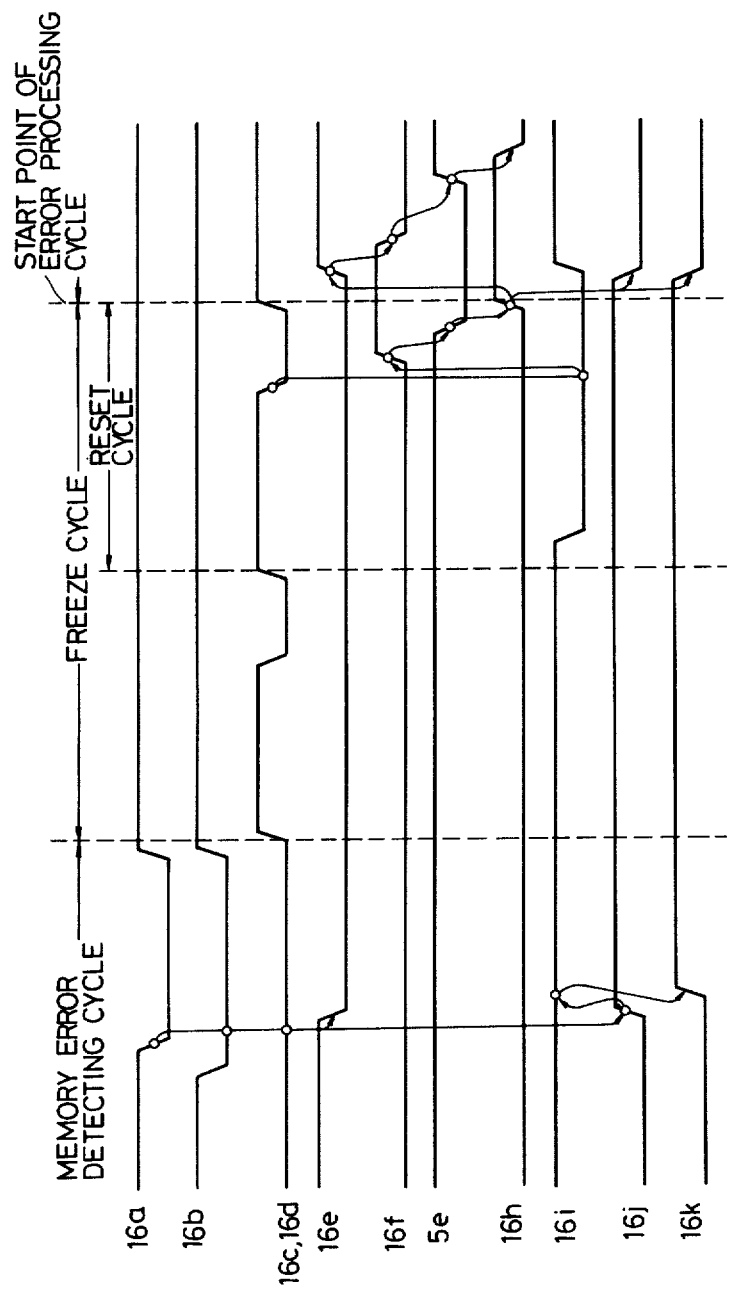

This corresponds to a freeze cycle indicated in FIG. 14. The status continues till a cycle in which the signal line 16i becomes "0" upon the termination of the instruction execution. When the signal line 16i has become "0" owing to the termination of the instruction execution, the signal 16f is made "1" by the reset generating gate 1602, the reset output 5e is transmitted to the exterior through the reset output driver 1604, and the memory error flip-flop 1601 and the freeze flip-flop 1603 are initialized by the reset signal 16h through the reset input driver 1605. This corresponds to a reset cycle in FIG. 14.

Figure 15:
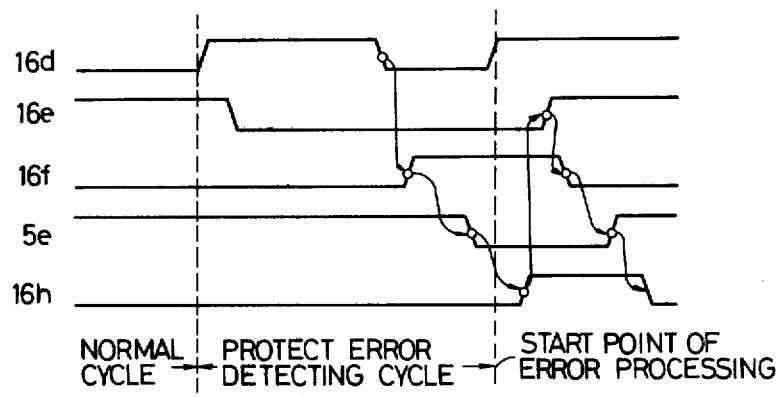

Lastly, the error processing at the development of a protect error will be described with reference to a time chart of FIG. 15.

When the protect error is limited only to the protection of write into the main memory 510, no protect error occurs during the instruction fetch because only the readout from the main memory 510 is done during the period. Accordingly, it is unnecessary to check whether or not the MPU 500 is fetching at the occurrence of the protect error, and the reset cycle is immediately shifted to. More specifically, the contents of the internal memory address register 601 and the protect register 604 are compared inside the MPU 500. The protect error detection signal 6j of the comparator 618 for detecting the protect error is applied to the two flip-flops 2000 and 2001, which are set by a signal 21a ($\phi_1$).

The flip-flop 2000 delivers its output signal 21c to the gate 2002, from which a protect error signal 16l is provided in synchronism with the clock 16d ($\phi_2$).

The signal 16l is directly applied to the reset generating gate 1602, to deliver the reset output 5e to the exterior through the reset output driver 1604.

On the other hand, since the protect error is detected inside the MPU 500, means for storing the protect error becomes necessary. This means needs to be reset by the system reset signal RST and must not be reset by the error reset 5e.

The system reset signal RST is subjected to the wired OR with the reset output 5e due to the error, and the result is again put into the MPU 500 through the reset input driver 1605.

Figure 16:
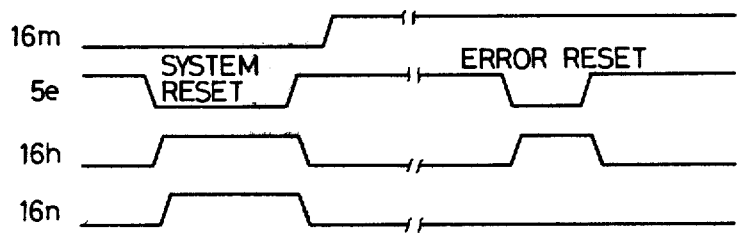

At the system reset, the data processor is in the stop status. Therefore, by supplying a stop information 16m to one input terminal of the system reset allowance gate 1606, and output 16n of this gate permits only the system reset signal to pass therethrough as illustrated in FIG. 16.

The system reset signal RST and the error reset signal 5e above described are utilized as follows at the occurrence of the protect error.

The flip-flop 2000 is reset and initialized by the signal 16h.

On the other hand, the flip-flop 2001 is set at the occurrence of the protect error similarly to the flip-flop 2000. Since, however, the former is reset by only the system reset signal 16n owing to the system reset allowance gate 1606, it is not reset by the reset signal 5e attributed to the error, and hence, it can store the development of the protect error.

Figure 17:
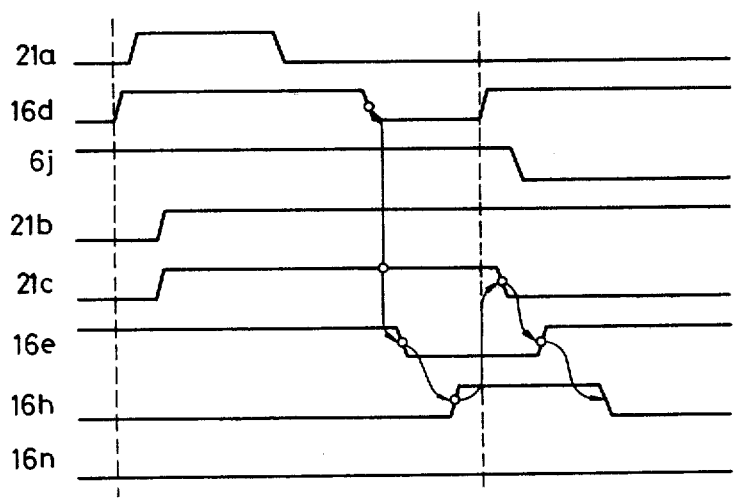
FIG. 17 is a diagram which illustrates the situation of separating a system reset signal from a reset output signal.

The operating time chart of these flip-flops at the occurrence of the protect error is shown in FIG. 17.

As described above in detail, according to the preferred embodiments of this invention, the memory errors (protect error, parity error, address over) detected inside or outside the instruction fetch microprocessor are obtained as the reset signals with smaller numbers of input/output signals (number of pins) and external circuits, to clear the microprogram counter, whereby the control is permitted to shift to the first address (address zero) of the error processing microprogram.

In this manner, according to the present invention, when an abnormalcy has been detected, the microprogram counter can be cleared by the same procedures as in the case of initializing the system, and besides, the factor for the development of the abnormalcy can be held. Moreover, these are realized with the smaller numbers of LSI input/output signal lines and external circuits.

We claim:

1. An LSI microprocessor comprising an instruction fetch portion and an instruction execute portion which conduct the fetch of an instruction and the execution of an instruction from a main memory disposed outside said LSI microprocessor and which store instructions and operands therein, independently of each other under a control of a microprogram stored in a microprogram memory, a pipeline control being made while synchronizing both of the portions, said instruction fetch portion comprising:

(a) a first bidirectional bus driver for delivering microprogram address information to a microprogram counter of said microprogram memory and receiving a micro instruction from said microprogram memory, (b) a second bidirectional bus driver for delivering an address to said main memory and receiving an instruction word or operand from said main memory, (c) a micro instruction decoder which is connected to said first bidirectional bus driver through a first input bus and which decodes the received micro instruction to obtain various control signals, (d) an input/output controller which is connected to said first bidirectional bus driver through the first input bus and which makes a control with an input-/output device including said main memory, (e) a program counter, an internal memory address register, a protection register, a memory register and an instruction register which are connected to said second bidirectional bus driver through second input and output buses, (f) a random access memory and an adder which are connected to the program counter, the internal memory address register, the memory register and the instruction register through a bidirectional bus and which are used for determining an operand address, (g) an instruction decoder which decodes a content of said instruction register and which delivers a microprogram address pattern to said microprogram counter of said microprogram memory through said first bidirectional bus driver, (h) a comparator which detects a memory protection error and which delivers a memory protection error signal by comparing the operand address being stored in the interval memory address register and a protection area stored in said protection register, and (i) an error processing circuit which receives the memory protection error signal and an externally detected memory error signal concerning said main memory, said error processing circuit including means for blocking the delivery of a clock to write to the registers connected to the bidirectional bus and means for delivering a reset signal to clear the microprogram counter and start an error processing microprogram in response to receiving one of said error signals.

2. An LSI microprocessor according to claim 1, wherein said error processing circuit comprises:

(a) a memory error input gate which receives the externally detected memory error signal when a predetermined condition holds, (b) a memory error flip-flop which stores therein the memory error signal from said memory error input gate, (c) a reset generating gate which delivers the memory error signal stored in said memory error flip-flop, in a cycle in which said instruction fetch portion is not fetching a next instruction, and (d) a reset output driver which delivers the output of said reset generating gate to clear the microprogram counter and start an error processing microprogram.

3. An LSI microprocessor according to claim 2, wherein said predetermined condition includes the presence of the following signals (a) to (c):

(a) an access-end signal from said main memory, (b) a signal indicating that a direct memory access control is not proceeding, and (c) a signal indicating a period in which the memory error is to occur.

4. An LSI microprocessor according to claim 1, wherein said error processing circuit comprises a freeze flip-flop and a gate, wherein the freeze flip-flop is set when the memory error flip-flop has been set and said instruction fetch portion has started a fetch operation for a next instruction, and wherein the gate ceases passing the clock for writing to the registers in accordance with the output of the freeze flip-flop.

5. An LSI microprocessor according to claim 2, wherein said error processing circuit comprises:

first and second error flip-flops which store therein the memory protection error signal from said comparator, a reset input driver which receives the reset output signal and an external system reset signal at a single input terminal, and a system reset allowance gate which decides whether or not a signal received from said single input terminal is said system reset signal, wherein said first protect error flip-flop delivers the reset signal through the reset generating gate and the reset output driver and then is reset by the reset signal through the reset input driver, and wherein the second protect error flip-flop holds the memory protection error signal until being reset by an output of said system reset allowance gate.

6. An LSI microprocessor according to claim 1, wherein said error processing circuit comprises:

(a) a memory error input gate which receives the externally detected memory error signal under conditions of the presence of an access-end signal from said main memory, the presence of a signal indicating that a direct memory access control is not proceeding, and the presence of a signal indicating a period in which the memory error is to occur, (b) a memory error flip-flop which stores therein the memory error signal from said memory error input gate, (c) first and second protect error flip-flops which store therein the memory protect error signal from said comparator, (d) a reset generating gate which delivers the memory error signal stored in said memory error flip-flop, in a cycle in which said instruction fetch portion is not fetching a next instruction, and which also delivers the memory protect error signal stored in said first protect error flip-flop, (e) a reset output driver which delivers the output of said reset generating gate to clear the microprogram counter to start an error processing microprogram, (f) a freeze flip-flop which is set when the memory error flip-flop has been set and said instruction fetch portion has started a fetch operation for a next instruction, (g) a gate which ceases passing the clock signal for writing to registers by the output of the freeze flip-flop, (h) a reset input driver which receives an output signal and an external system reset signal at a single input terminal and which resets said memory error flip-flop, said first protect error flip-flop and said freeze flip-flop, and (i) a system reset allowance gate which decides whether or not a signal received from said single input terminal is said system reset signal and which resets said second protect error flip-flop.

* * * * *